April 4, 1961  I. K. WEISS ET AL  2,978,253
INDEPENDENT FRONT WHEEL SUSPENSION CASTER
AND CAMBER ADJUSTING MEANS
Filed Sept. 4, 1959  2 Sheets-Sheet 1

INVENTORS
Irvin K. Weiss,
Alex C. Mair,
Charles W. Jackman,
Arthur S. Brown &
BY Garth R. Sayers
W. F. Wagner
ATTORNEY

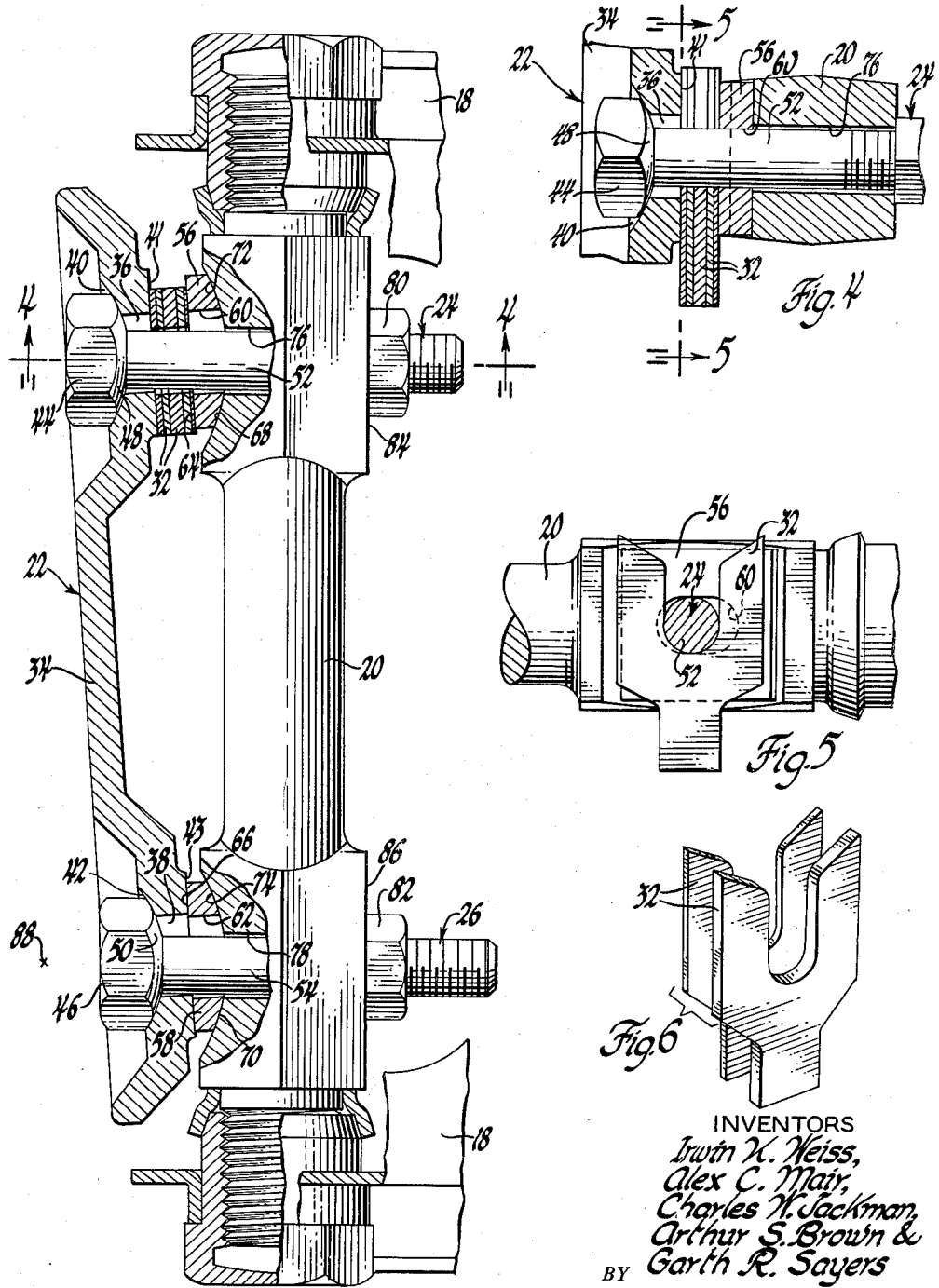

United States Patent Office 2,978,253
Patented Apr. 4, 1961

2,978,253

INDEPENDENT FRONT WHEEL SUSPENSION CASTER AND CAMBER ADJUSTING MEANS

Irwin K. Weiss and Alex C. Mair, Birmingham, Charles W. Jackman and Arthur S. Brown, Detroit, and Garth R. Sayers, Pontiac, Mich., assignors to General Motors Corporation, Detroit, Mich., a corporation of Delaware Filed Sept. 4, 1959, Ser. No. 838,153

6 Claims. (Cl. 280—96.2)

This invention relates to vehicle suspension and more particularly to independent wheel suspension caster and camber adjusting mechanism.

An object of the invention is to provide an improved independent wheel suspension for vehicles.

Another object is to provide independent wheel suspension incorporating improved caster and camber adjusting means.

A further object is to provide an independent wheel suspension of the type including transversely extending vertically spaced wishbone arms, one of which arms is swingable about an inboard pivot shaft rigidly attached to a support on the vehicle frame by connecting means including longitudinally spaced bolts and a spacer assembly of suitable thickness disposed around the bolts between the frame and pivot shaft to align the latter in a predetermined lateral position and angular relation to the other arm providing the desired caster and camber adjustment, the connecting means being so formed and arranged as to eliminate bending stresses on the bolts resulting from substantial non-parallelism between the shaft and the support.

A further object is to provide a device of the type described wherein the spacer assembly includes a washer surrounding each attaching bolt which is formed with a convex surface adapted for bearing engagement with a concave surface formed on the pivot whereby variation in angular relationship of the shaft and frame mounted support is accommodated by angular displacement of the washer, and thereby permits maintenance of total surface contact between the support, spacer elements and pivot shaft.

A further object is to provide a wheel suspension control arm mounting construction of the type wherein a pivot shaft is rigidly attached to the frame mounted support by a pair of longitudinally spaced bolts which extend through both the support and shaft, wherein means are provided which allow each of the bolts to assume dissimilar angular inclinations relative to the supporting member incident to alignment of the pivot shaft to achieve a given caster and camber adjustment.

These and other objects, advantages, and features of the invention will become more fully apparent as reference is had to the accompanying specification and drawings wherein:

Figure 3 is an enlarged fragmentary plan view, partly in section and with parts broken away, illustrating the details of construction of the means for mounting and adjusting the pivot shaft to accomplish caster and camber adjustment of the vehicle wheels;

Figure 4 is an enlarged fragmentary view, partly in section, looking in the direction of arrows 4—4 of Figure 3;

Figure 5 is a fragmentary view looking in the direction of arrows 5—5 of Figure 4; and Figure 6 is a perspective view showing the form of shims utilized in the invention.

Figure 1:
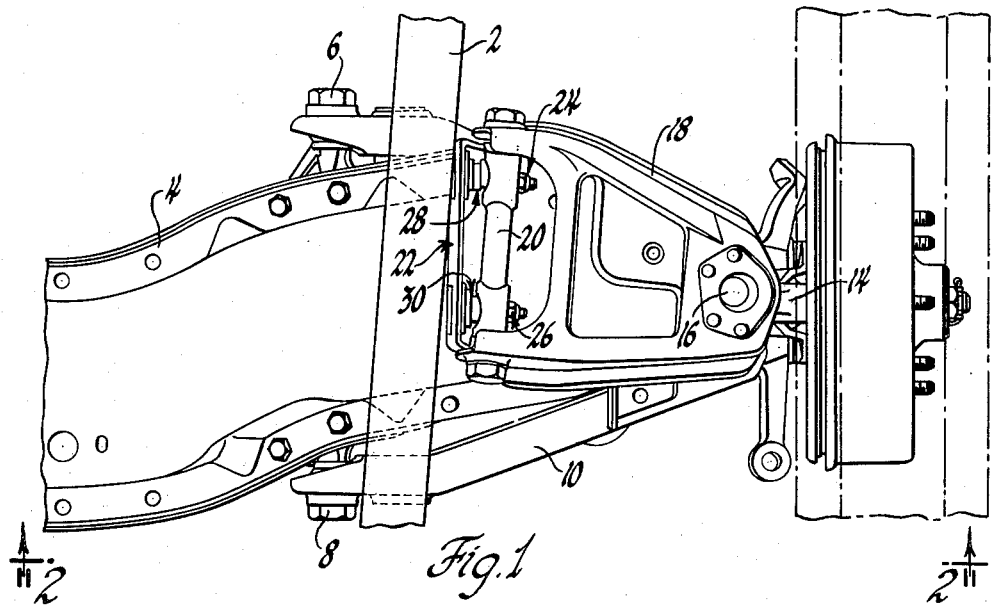
Figure 1 is a fragmentary plan view illustrating a dirigible wheel independent suspension incorporating the invention.
Figure 2:
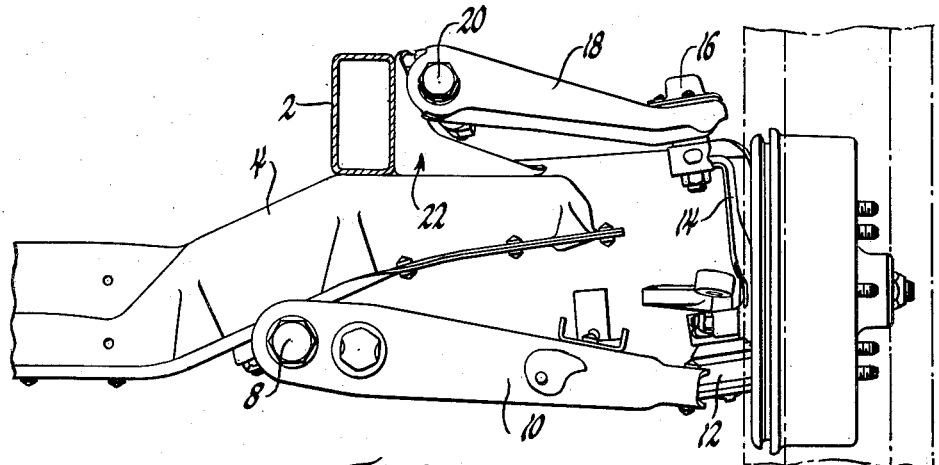
Figure 2 is a fragmentary front elevational view looking in the direction of arrows 2—2 of Figure 1.

Referring now to the drawings and particularly Figures 1 and 2, there is illustrated a portion of a vehicle chassis in which the reference numeral 2 designates the vehicle frame side rail. Extending transversely of and connected to side rail 2 is a frame across member 4 which extends beneath side rail 2 and somewhat outboard thereof. Pivotally attached to cross member 4 on a generally longitudinal axis defined by pivot studs 6 and 8 is a lower wishbone arm 10. Arm 10 extends transversely outwardly and is pivotally connected at its outboard end by a ball joint assembly 12 to the lower end of a vertically disposed wheel supporting knuckle assembly 14. At its upper end, knuckle supporting assembly 14 is pivotally connected by a ball joint assembly 16 to the outboard end of a transversely extending upper wishbone arm 18. The inner bifurcated end of arm 18 is pivotally connected to a longitudinally extending pivot bar 20, the central portion of which is rigidly attached to a bracket 22 by longitudinally spaced attaching bolts 24 and 26. Bracket 22, in turn, is rigidly attached, in any suitable manner, to the upper surface of cross frame member 4 and the outer side wall of frame side rail 2.

Interposed between pivot bar 20 and adjacent bracket 22 and surrounding bolts 24 and 26 are spacer assemblies 28 and 30, one or both of which may include a variable number of shims 32 (Figure 4) which function to establish and maintain the horizontal angular position of the pivot bar necessary to effect the requisite caster and camber adjustment for the suspension.

Although the use of shim packs for aligning suspension of pivot shafts is already known, past constructions utilizing this expedient have been susceptible to early failure due to serious bending stresses imposed on the attaching bolts where the required angular adjustment of the pivot bar placed the latter substantially out of parallelism with the adjacent surface of the attachment bracket. In addition, when one end of the pivot bar is clamped in direct abutting engagement with the attachment bracket, while the other end is spaced a substantial distance therefrom by interposed shims, subsequent tightening of the bolts induces an edge contact between the abutting surfaces of the pivot bar, shims, and supporting bracket. Subsequent brinelling of the edge loaded surfaces occurs which, under service conditions, results in progressive deterioration of the original clamping force to an extent permitting loss of the shims. The present invention, however, completely eliminates both of the aforementioned problems and allows an even wider range of adjustment than heretofore possible.

As seen best in Fig. 3, the vertical wall portion 34 of supporting bracket 22 is provided with longitudinally spaced apertures 36 and 38 which are bounded on the inboard side by concave seat portions 40 and 42 and on the outboard side by flat surfaces 41 and 43. Attaching bolts 24 and 26, previously mentioned, are formed with head portions 44 and 46 having convex shoulders 48 and 50 which are adapted for bearing engagement with seat portions 40 and 42. The stem portions 52 and 54 of bolts 24 and 26 are dimensioned so as to fit loosely in apertures 36 and 38 and thus allow considerable angular or rocking motion of bolts 24 and 26 relative to support bracket wall 34. Surrounding each stem portion 52 and 54 and disposed between bracket 22 and pivot bar 20 are circular washers 56 and 58 having apertures 60 and 62 which are substantially elongated horizontally. Washers 56 and 58 are formed with flat inboard surfaces 64 and 66 and convex outboard surfaces 68 and 70 the latter of which effect bearing engagement with cooperating concave surfaces 72 and 74 formed near the opposite ends of pivot bar 20. Stem portions 52 and 54 extend transversely through apertures 76 and 78 in pivot bar 20 and secure the latter in place by tightening nuts 80 and 82 into abutting engagement with the outboard flat surfaces 84 and 86.

In order to fully understand the beneficial characteristics of the invention, consideration must be given to the geometry involved when the pivot bar 20 is angularly displaced relative to wall 34. By reference to Figure 3, it will be seen that clockwise angular movement of the rear end of pivot shaft 20 from a condition of parallel relationship with surface 34, requires that the entire pivot shaft 20 move about an imaginary vertical axis 88 which contains the geometric center of the convex surface 50 of bolt head 46. From further consideration, it will be evident that such angular movement of shaft 20 about axis 88 also results in a certain degree of bodily forward movement of the pivot shaft. Therefore, assuming that the adjacent apertures in the mounting bracket and the pivot shaft were initially axially aligned, it will be evident that such alignment is progressively disturbed so that the adjacent apertures are not only inclined with respect to each other but are also somewhat offset in a horizontal plane. However, because the horizontal dimension of apertures 36 and 38 are larger than the stem portions 52 and 54, both forms of misalignment are accommodated. In addition, concurrently with the self-alignment achieved by the attaching bolts, washers 56 and 58 are permitted to slide in a direction parallel with the flat outboard surface 41 and 43 of wall 34 and thus compensate for the longitudinal displacement which accompanies angular displacement of pivot shaft 20. Therefore, as shims 32 are added between the washer 56 and the flat outboard surface of wall 34 surrounding aperture 36, washer 56 automatically seeks a new angular position which will maintain total contact between its flat surface 64 and the flat surface of shim pack 32 and allow the shim pack to achieve total surface contact with the flat surface of wall 34. As a result, within the limits of the horizontal clearance betwen aperture 36 and bolt stem 52, the angle between pivot shaft 20 and wall 34 may be progressively increased and yet subsequent tightening of nut 80 to clamp the assembly in a rigid condition will impose only tension loading on the bolt 24. It will, of course, be evident that washer 58 will also move longitudinally on wall 34 and angularly in bearing 74 of pivot shaft 20 during the adjustment described, since swinging movement of bolt 26 about imaginary axis 88 induces a forward component of movement of the entire pivot shaft.

While but one embodiment of the invention has been shown and described, it will be apparent that other changes and modifications may be made therein. It is, therefore, to be understood that it is not intended to limit the invention to the embodiment shown, but only by the scope of the claims which follow.

What is claimed is:

1. In a suspension control arm mounting assembly of the type including a pivot shaft attached to a support by spaced bolts extending through aligned apertures formed in said shaft and said support, wherein caster and camber adjustment is accomplished by bolt straddling shims interposed between the shaft and the support, means forming concave depressions on the inner surfaces of said shaft and said support bounding said apertures, each bolt having a head formed with a convex shoulder mating with the adjacent concave depression on said support, a plano-convex spacer surrounding each bolt between said shaft and said support, the convex surface of each spacer mating with the adjacent concave depression of said shaft, whereby total surface contact is maintained between the bolt heads, support, shims, spacers, and shaft throughout a substantial range of angular adjustment of said shaft and bolts relative to said support.

2. In a suspension control arm mounting assembly of the type including a pivot shaft attached to a support by spaced bolts having straight shank portions extending through aligned apertures formed in said shaft and said support, wherein caster and camber adjustment is accomplished by bolt straddling shims interposed between the shaft and the support, means forming concave depressions on the inner surfaces of said shaft and said support bounding said apertures, each bolt having a head formed with a convex shoulder mating with the adjacent concave depression on said support, a plano-convex spacer surrounding each bolt between said shaft and said support, the convex surface of each spacer mating with the adjacent concave depression of said shaft, whereby total surface contact is maintained betwen the bolt heads, support, shims, spacers, and shaft throughout a substantial range of angular adjustment of said shaft and bolts relative to said support.

3. The structure set forth in claim 2 wherein the apertures in said support are substantially larger than the diameter of said bolt shanks.

4. The structure set forth in claim 2 wherein the plano-convex spacers are formed with transversely elongated apertures through which the bolt shanks extend.

5. The structure set forth in claim 2 wherein the outer surfaces of said support and said shaft are formed with flat bearing surfaces bounding said apertures.

6. The structure set forth in claim 2 wherein the apertures in said support are substantially larger than the diameter of said bolt shanks and the apertures in said shaft closely surround said shanks.

References Cited in the file of this patent

UNITED STATES PATENTS

| | | |
|---|---|---|
| 2,068,968 | Urbanek | Jan. 26, 1937 |
| 2,323,177 | Baker | June 29, 1943 |
| 2,772,596 | Trussell | Dec. 4, 1956 |
| 2,882,066 | Petrak | Apr. 14, 1959 |